(12) United States Patent
Maruta

(10) Patent No.: US 6,536,855 B2
(45) Date of Patent: Mar. 25, 2003

(54) FRONT CABINET AND TELEVISION SET

(75) Inventor: Naoto Maruta, Daito (JP)

(73) Assignee: Funai Electric Co., Ltd., Daito (JP)

( * ) Notice: Subject to any disclaimer, the term of this patent is extended or adjusted under 35 U.S.C. 154(b) by 14 days.

(21) Appl. No.: 09/835,386

(22) Filed: Apr. 17, 2001

(65) Prior Publication Data
US 2001/0030491 A1 Oct. 18, 2001

(30) Foreign Application Priority Data
Apr. 18, 2000  (JP) ....................................... 2000-002540

(51) Int. Cl.$^7$ ................................................. A47B 81/06
(52) U.S. Cl. ......................................................... 312/7.2
(58) Field of Search .............................. 312/7.2, 223.1, 312/223.2; 348/825, 836; 248/917, 918; 361/681, 682

(56) References Cited

U.S. PATENT DOCUMENTS

| | | | | |
|---|---|---|---|---|
| 4,017,129 A | * | 4/1977 | Boldt et al. .................... | 312/7.2 |
| 5,359,421 A | * | 10/1994 | Maeda .................... | 348/836 X |
| 5,526,064 A | * | 6/1996 | Okugawa et al. ........... | 348/818 |
| 5,742,360 A | * | 4/1998 | Kwon et al. .............. | 312/7.2 X |
| 6,233,026 B1 | * | 5/2001 | Kim et al. ................ | 312/7.2 X |

FOREIGN PATENT DOCUMENTS

| | | | | |
|---|---|---|---|---|
| DE | 3307891 | * | 9/1984 | ................ 312/7.2 |
| FR | 2554299 | * | 5/1985 | ................ 312/7.2 |
| JP | 57-46372 | | 8/1980 | |
| JP | 61-90372 | | 6/1986 | |
| JP | 4-31181 | | 3/1992 | |
| JP | 4-167878 | | 6/1992 | |
| JP | 9-247585 | | 9/1997 | |
| JP | 10-271415 | | 10/1998 | |

* cited by examiner

*Primary Examiner*—James O. Hansen
(74) *Attorney, Agent, or Firm*—Crowell & Moring LLP

(57) ABSTRACT

When a picture tube, in particular one having a flat picture screen, is fixed on a front cabinet, a gap otherwise occurring between peripheral portions of an opening and peripheral edges of the picture screen, is reduced by providing thin-wall portions having a thickness thinner than the other portions of the front wall between each of linear portions of ribs formed on peripheral portions of the opening and each of the outer wall surfaces surrounding the front wall. In this connection, when a worker fastens screws for fixing the picture tube to the front cabinet, the front wall is bent toward the flat picture screen in association with the movement of screw-retaining bosses toward screw mounting units making it possible to closely fit the ribs to the picture screen.

2 Claims, 5 Drawing Sheets

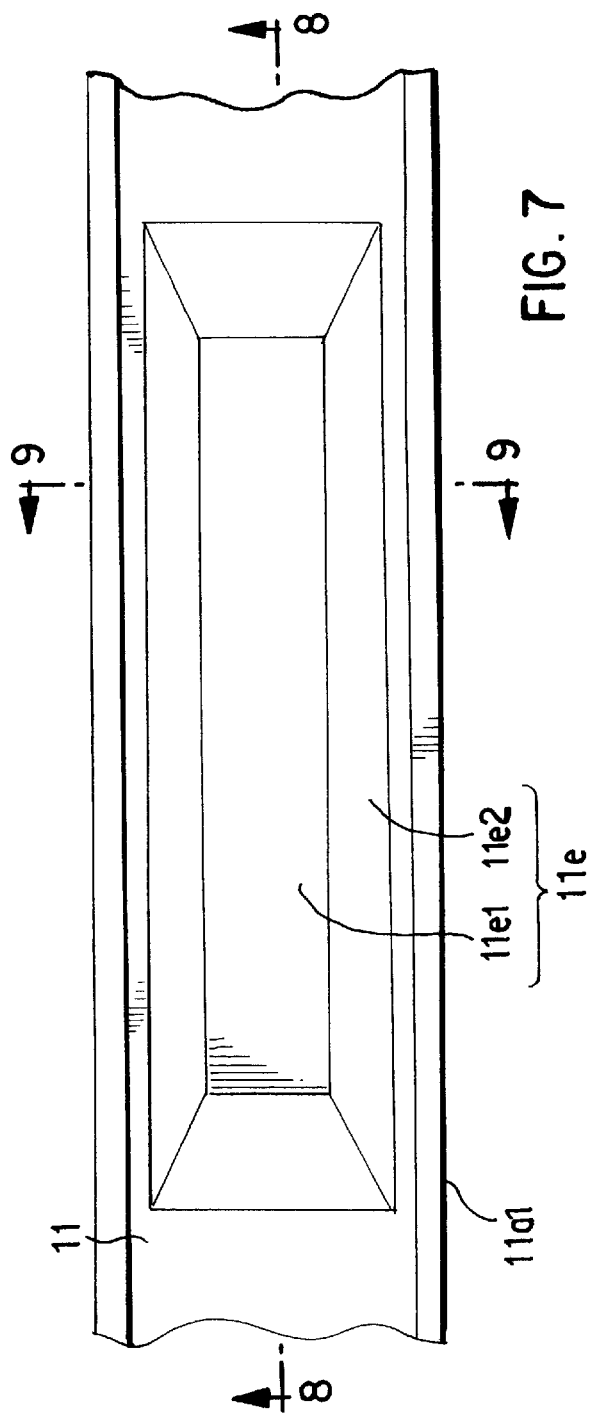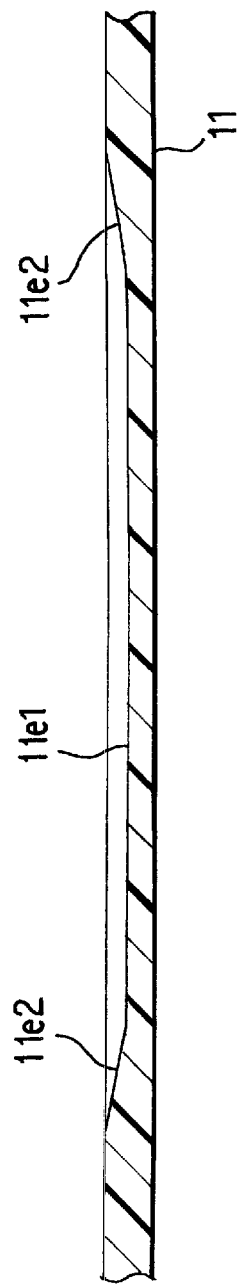

FRONT CABINET AND TELEVISION SET

BACKGROUND OF THE INVENTION

1. Field of the Invention

The present invention relates to a front cabinet and a television set, which comprise a front wall with an opening for keeping a picture screen on front side of a picture tube at a position facing to outside, and which can fasten and fix the picture tube on a fixing unit on backside of the front wall.

2. Description of the Prior Art

As a conventional type front cabinet of a television set, a front cabinet as disclosed in JP-A-10-271415 is known.

In this front cabinet, there is provided an opening of approximately rectangular shape for keeping a picture screen of a picture tube at a position facing to outside. The depth dimension of peripheral portion of the opening is adjusted to closely follow the frontal shape of the picture tube so that it can be bent and deformed when the picture tube is fixed on it. The adjustment amount of bending and deformation at the center on lower edge of the opening is set to a value higher than the adjustment amount of bending and deformation at the center of the other three sides. With the arrangement as described above, in case a large type picture tube with curved picture screen is mounted, it is possible to eliminate a gap between peripheral portions of the opening and peripheral edges of the picture screen when these are closely fitted to each other.

In the conventional type front cabinet as described above, no consideration is given on the case where a picture tube with a flat picture screen is mounted. Also, when the picture tube is manufactured, deviations are very likely occur in the position of the fixing unit for fixing the picture screen to the front cabinet and in the position of the picture screen itself. For this reason, a gap may occur between peripheral portions of the opening and peripheral edges of the picture screen when the picture tube is fixed on the front cabinet.

SUMMARY OF THE INVENTION

To solve the above problems, it is an object of the present invention to provide a front cabinet and a television set, by which it is possible to closely fit peripheral portions of an opening and peripheral edges of a picture screen even when a picture tube with a flat picture screen is mounted.

First, a television set with a front cabinet according to the present invention comprises a picture tube having a flat picture screen on front side;

a front cabinet made of synthetic resin which comprises a front wall with an opening in approximately rectangular shape and for keeping the picture screen at a position facing to outside, side walls, an upper wall and a lower wall, being extended toward backside so as to enclose peripheral edges of the front wall, a screw-retaining boss for fixing the picture tube by screw is formed at each of four corners on backside of the front wall, ribs closely fitted to the picture screen are projected toward backside of the front opening of the front wall, thin-wall portions, being provided on backside of the front wall surface between linear portions of said ribs and peripheral edge of the front wall and having thinnest-wall portions in approximately rectangular shape and tilted portions in which thickness gradually reduced to said thinnest-wall portion; and a rear cabinet, made of synthetic resin and in approximately box shape, to be assembled by bringing an opening thereof face-to-face to an opening formed by the side walls, the upper wall and the lower wall of said front cabinet, wherein the thin-wall portions are designed in such manner that, when the screws are fastened, the front wall is bent toward the picture screen in association with the movement of the screw-retaining boss toward the picture screen and the ribs are closely fitted to the picture screen.

Further, the front cabinet made of synthetic resin according to the present invention comprises a front wall with an opening for keeping a picture screen on front side of a picture tube at a position facing to outside, and for fastening and fixing the picture tube to a fixing unit on backside of the front wall, wherein there are provided thin-wall portions on peripheral portions of the opening so that, when the picture tube is fastened and fixed, peripheral portions of the opening are bent toward the picture screen of the picture tube and peripheral portions of the opening are closely fitted to edges of the picture screen of the picture tube.

In the present invention with the arrangement as described above, in the assembling procedure, a worker keeps the picture screen on front side of the picture tube at a position opposite to the opening and facing to outside. Then, the picture tube is fastened and fixed to a fixing unit on backside of the front wall. Then, peripheral portions of the opening are bent toward the picture screen. This is because the front cabinet is made of synthetic resin and the peripheral portions of the opening are designed as easily bendable by providing thin-wall portions with thickness thinner than the thickness of the other portions.

As a result, the peripheral portions of the opening are bent toward the picture screen and are closely fitted to edges of the picture screen. This eliminates the possibility that gap may occur between the peripheral portions of the opening and the peripheral edges of the picture screen due to deviations caused at the time of manufacture of the picture tube.

Also, when the picture screen is flat, it is difficult to deform the front wall to follow the shape of the picture screen as the picture tube is fastened and fixed. With the arrangement as described in the present invention, it is possible to easily eliminate the gap between peripheral portions of the opening and peripheral edges of the picture screen even when the picture screen has flat shape. However, the fixing of the picture tube with a flat picture screen is merely an application example of the present invention, and the present invention is also applicable to the case where the picture tube with curved picture screen is fixed.

As described above, the present invention can provide a front cabinet and a television set, in which it is possible to closely fit peripheral portions of the opening to peripheral edges of the picture screen even when the picture tube with a flat picture screen is mounted.

The fixing unit as described above may be of any type so far as it is formed on backside of the front wall and is used to fasten and fix the picture tube. As an arrangement example, according to another aspect of the present invention, the fixing unit is provided with screw-retaining boss erected from the front wall toward backside.

In the invention with the arrangement as described above, the picture tube is fastened and fixed using screws to the screw-retaining boss erected from the front wall toward backside. In this case, when the screws are fastened and a screw fastening allowance between the picture tube and the screw-retaining boss is used up, the screw-retaining boss is gradually moved toward the picture tube. Then, the peripheral portions of the opening are bent toward the picture screen, and the peripheral portions of the opening are closely fitted to peripheral edges of the picture screen.

As described above, it is possible according to the present invention to provide a simple arrangement to fasten and fix the picture tube by screws.

The thin-wall portion as described above may be of any type so far as it is formed on peripheral portion of the opening. As an example of the position of the thin-wall portion, according to another aspect of the present invention, both the picture screen of the picture tube and the opening are designed in approximately rectangular shape. The fixing unit may be designed in such manner that each of the corners of the picture screen is fastened and fixed, and the thin-wall portions may be provided near peripheral edges of the opening.

In the invention with the arrangement as described above, when each of the corners of the picture screen is fastened and fixed on the fixing unit while keeping the picture screen at a position facing to the opening of approximately rectangular shape, a thin-wall portion is provided near each of peripheral portions of the opening. Therefore, it is possible to eliminate the gap at peripheral portions of the opening of approximately rectangular shape where the gap is most likely to occur.

As described above, according to the present invention, it is possible to easily eliminate the gap at the portion where the gap is most likely to occur.

The thin-wall portion may be of any type so far as it is provided on the front wall. As an example, according to still another aspect of the present invention, the thin-wall portion may be provided on backside of the front wall.

In the invention with the arrangement as described above, the thin-wall portion is provided on backside of the front wall, i.e. on the side of the front wall opposite to the picture screen. Therefore, the thin-wall portion is hidden on the backside of the front wall, and this makes it possible to avoid adverse effect on external design of the front cabinet, and this contributes to the usefulness of the present invention.

As described above, it is possible according to the present invention to provide the thin-wall portion without giving adverse effect to external design.

As an example of the shape of the thin-wall portion, according to still another aspect of the present invention, tilted portions maybe formed by gradually reducing the thickness of the thin-wall portion.

In the invention with the arrangement as described above, the thin-wall portion has thickness gradually reduced along the tilted portions. This eliminates angular portion, to which the impact from outside may be concentrated. As a result, this contributes to the improvement of the durability of the front cabinet against the impact from outside.

As described above, it is possible according to the present invention to provide thin-wall portions while keeping the durability of the front cabinet.

Further, when the picture tube is fixed, it is possible to give special design to the thin-wall portions in order to ensure and increase the close fitting between the peripheral portions of the opening and the peripheral edges of the picture screen. As an example, according to still another aspect of the invention, ribs may be projected on backside to ensure close fitting with the peripheral edges of the picture screen, and close fitting with the picture screen can be attained when the picture tube is fastened and fixed. The thin-wall portions may be designed to include the ribs.

In the invention with the arrangement as described above, the ribs are projected toward the backside from peripheral edges of the opening and are closely fitted to the peripheral edges of the picture screen when the picture tube is fastened and fixed to the front cabinet. In this case, the ribs themselves are easily bent because the thin-wall portions are designed to include the ribs. This contributes to the better fitting between the peripheral portions of the opening and the peripheral edges of the picture screen.

As described above, according to the present invention, it is possible to improve and ensure close fitting between the peripheral portion of the opening and the peripheral edges of the picture screen.

More concretely, the front cabinet as described above comprises: a front cabinet made of synthetic resin, which comprises a front wall with an opening in approximately rectangular shape and for keeping the picture screen at a position facing to outside; side walls, an upper wall, and a lower wall that extended toward backside to enclose peripheral edges of the front wall; a screw-retaining boss for fixing the picture screen by screw is formed at each of four corners on backside of the front wall; ribs closely fitted to the picture screen are projected toward backside; thin-wall portions, being provided on backside of the front wall surface between linear portions of said ribs and peripheral edge of the front wall and having thinnest-wall portions in approximately rectangular shape and tilted portions in which thickness gradually reduced to said thinnest-wall portion, wherein the thin-wall portions are designed in such manner that, when the screws are fastened, the front wall is bent toward the picture screen in association with the movement of the screw-retaining boss toward the picture screen and the ribs are closely fitted to the picture screen.

BRIEF DESCRIPTION OF THE DRAWINGS

FIG. 7 is a plan view of an arrangement of a thin-wall portion;

FIG. 8 is a cross-sectional view along the line A—A in FIG. 7;

DESCRIPTION OF THE PREFERRED EMBODIMENT

Figure 1:
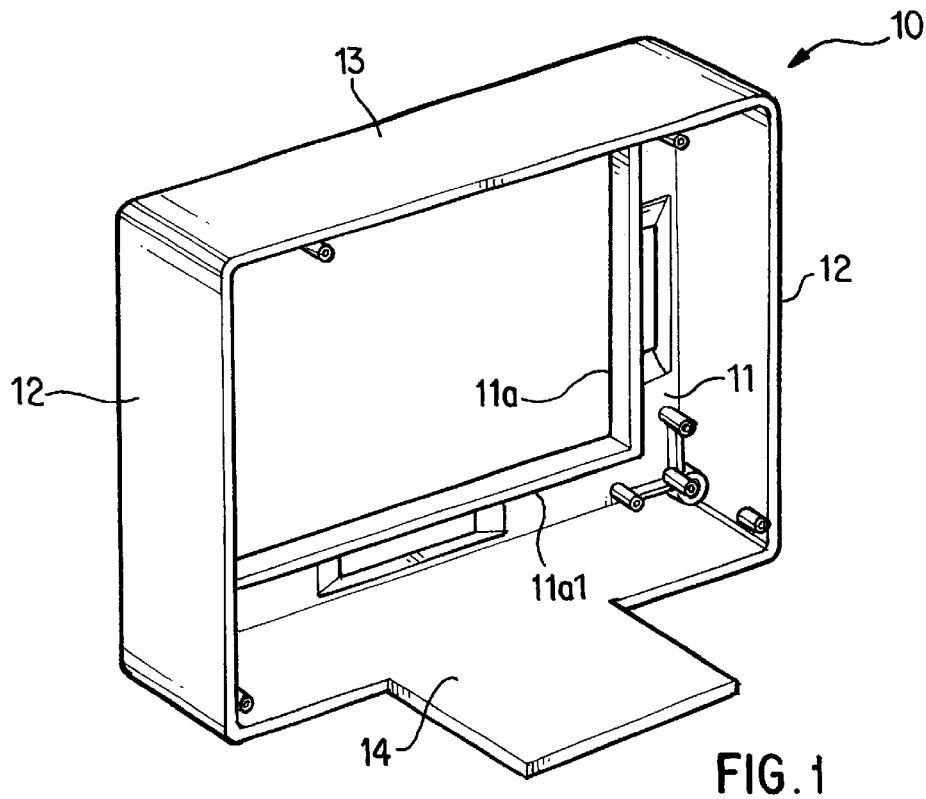
FIG. 1 is a perspective view to show external appearance of a front cabinet in an embodiment of the present invention.

Description will be given below on embodiments of the present invention referring to the drawings.

FIG. 1 is a perspective view showing external appearance of a front cabinet in an embodiment of the present invention.

The front cabinet 10 comprises: a front wall 11 with an opening 11a in approximately rectangular shape, which keeps a flat picture screen 21 of a picture tube 20 as to be described later at a position facing to outside; side walls 12 and 12, an upper wall 13, and a lower wall 14 that extended in approximately vertical direction from peripheral portion of the front wall 11 toward backside. On the peripheral edge of the opening 11a, a rib 11a1 is projected toward backside so that it is closely fitted to the picture screen 21 of the picture tube 20 when the picture tube 20 is fixed.

With the arrangement as described above, boards or substrates with circuits to fulfill various functions of the television system are assembled on the lower wall 14. With the picture screen 21 faced to the opening 11a, the picture tube 20 is fixed on the front wall 11 from backside. Then, to an opening formed by rear ends of the upper wall 13 and the lower wall 14, an opening of a rear cabinet (not shown) is placed at face-to-face position and these are assembled, and a cabinet is prepared.

Figure 2:
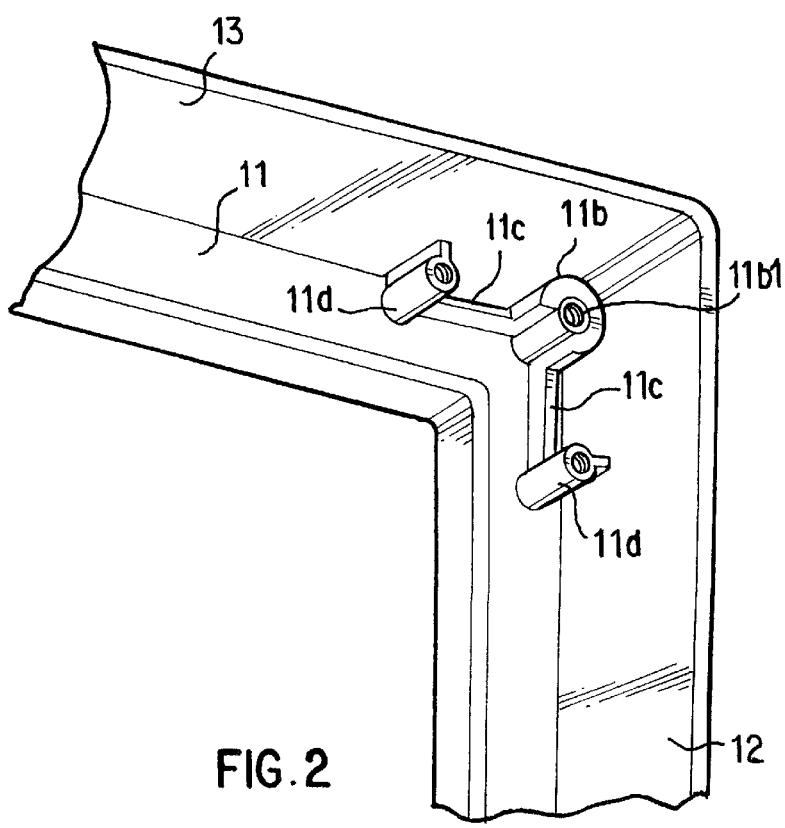
FIG. 2 is a perspective view of an arrangement of a screw-retaining boss.
Figure 3:
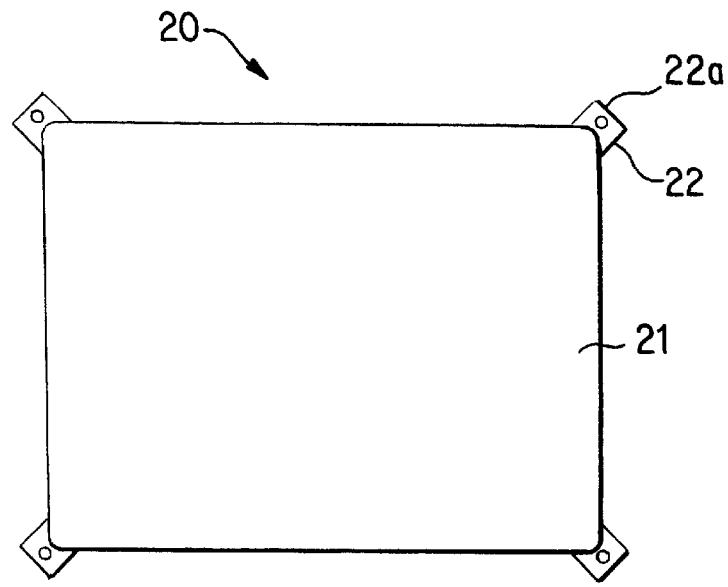
FIG. 3 is a plan view of an arrangement of a picture tube when it is seen from front side.

On rear surface at each of four corners of the front wall 11, a boss 11b in approximately cylindrical shape and used for retaining a screw 30 is formed as shown in FIG. 2, and the boss 11b has a screw fastening hole 11b1, through which a screw 30 as to be described later is inserted from backside and is fastened. On the other hand, at each corner of the picture tube 20, a screw mounting unit 22 with a screw insertion hole 22a is provided. The screw mounting unit 22 is projected in lateral direction approximately in parallel to the picture screen 21, and the screw can be passed through the screw insertion hole 22a in front-to-rear direction. In this connection, a worker passes a screw 30 through the screw insertion hole 22a and fastens and secures it in the screw fastening hole 11b1. As a result, the picture tube 20 is fixed on the front cabinet 10.

On peripheral wall of the screw-retaining boss 11b at each of four corners of the front wall 11, planar members 11c and 11c are integrally extended toward each of adjacent wall surfaces 12–14. At the end of each of the planar members 11c and 11c, positioning members 11d and 11d of approximately cylindrical shape and projecting from the front wall 11 toward backside are integrally formed. To fasten and fix the picture tube 20, side walls of the picture tube 20 are brought into contact with each of the positioning members 11d and 11d. Thus, the picture tube 20 is positioned on backside of the front cabinet 10.

As described above, when the picture tube 20 is positioned by the positioning members 11d, a screw fastening allowance is formed between the screw mounting unit 22 and the screw-retaining boss 11b. Thus, by fastening the screw 30 into the screw fastening hole 11b1 in the screw-retaining boss 11b, the screw-retaining boss 11b can be drawn and pulled toward the screw mounting unit 22.

In a conventional type front cabinet, the front wall 11 is designed with approximately even thickness. This gives sufficient rigidity to the front wall 11, and the front wall 11 is hardly deformed when the screw-retaining boss 11b is pulled toward the screw mounting unit 22.

Figure 4:
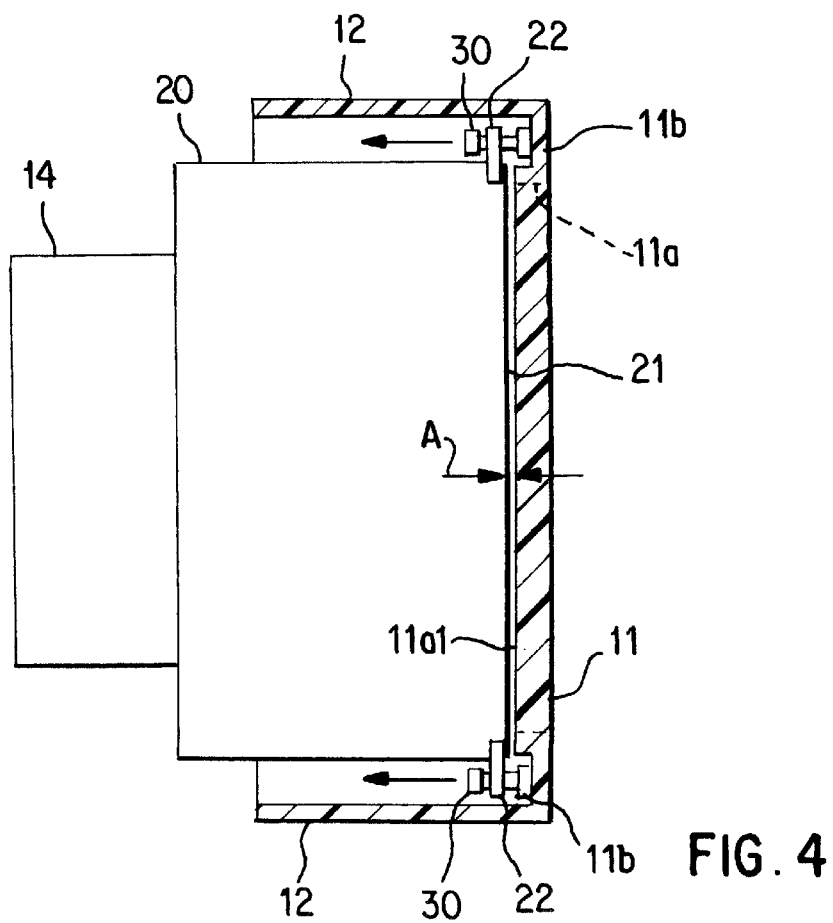
FIG. 4 is a partial cross-sectional view showing a condition where a picture tube is fixed by screws on a conventional type front cabinet.

When the picture tube 20 is manufactured, deviations are very likely to occur in the arranged position or in overall configuration of the screw mounting unit 22. Even after the worker fastens the screw 30 into the screw retaining boss 11b and screw fastening allowance is used up, a gap A is likely to occur between the rib 11a1 and the picture screen 21 of the picture tube 20 as shown in FIG. 4.

When the worker fastens and fixes the picture tube 20 to the front cabinet 10 by fastening the screws, it is necessary to adjust the fixing position of the picture tube 20 in each individual case in order to eliminate the gap A between the rib 11a1 and the picture screen 21 of the picture tube 20, and this decreases working efficiency in the assembling procedure.

For this reason, according to the present embodiment of the invention, special designing efforts are given to the structure of the front wall 11. Specifically, when the screw-retaining boss 11b is pulled toward the screw mounting unit 22 and the screw fastening allowance or interference is used up, it is designed in such manner that the front wall 11 is deformed toward the picture screen 21 so that the rib 11a1 is closely fitted to the picture screen 21 of the picture tube 20. Even when the gap A may remain between peripheral portion of the opening ha and the picture screen 21 of the picture tube 20 after the screws have been fastened due to the deviations in the shape of the picture tube 20 at the time of manufacture, the gap A can be eliminated through deformation of the front wall 11.

Figure 5:
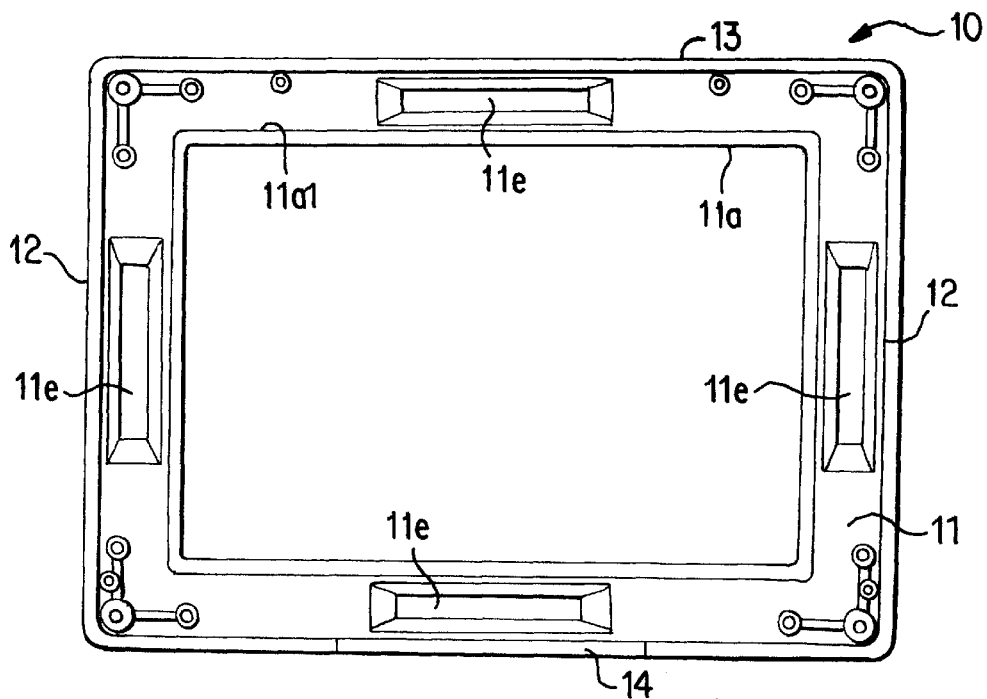
FIG. 5 is a plan view of an arrangement of the front cabinet when it is seen from backside.

FIG. 5 shows an arrangement example of the front wall 11 in the present embodiment.

As shown in FIG. 5, a thin-wall portion 11e is formed between linear portions of the rib 11a1 and each of the walls 12 to 14 surrounding the front wall 11 respectively. Each of the thin-wall portions has a thickness thinner than the thickness of the other portions. As a result, when the worker fastens the screws, it is bent toward the picture screen of the picture tube 20 in association with the movement of the screw-retaining boss 11b toward the screw mounting unit 22.

Figure 6:
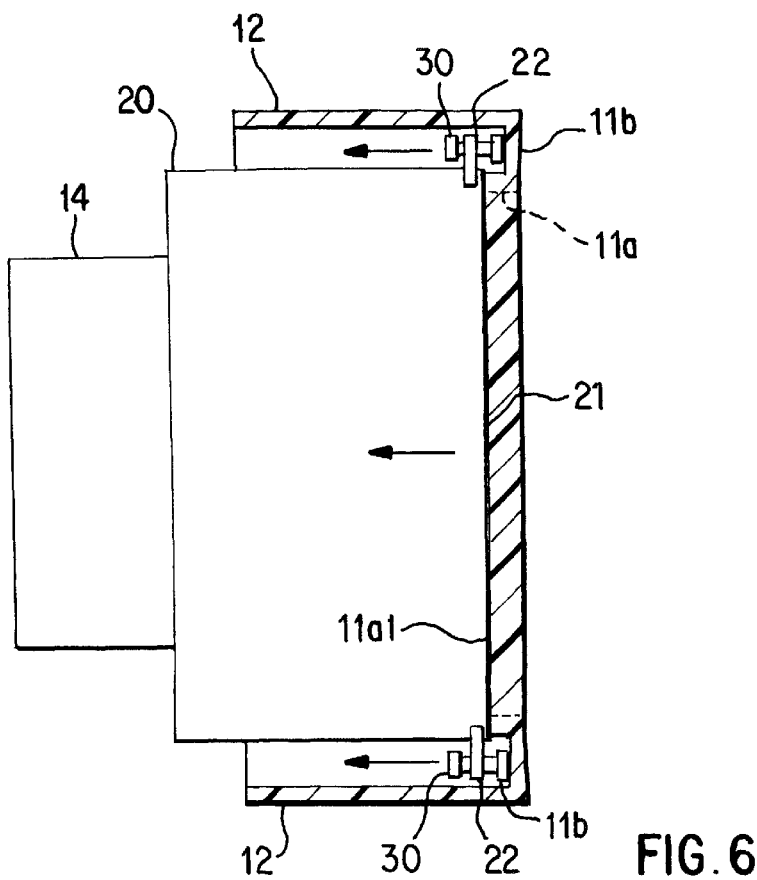
FIG. 6 is a partial cross-sectional view showing a condition where a picture tube is fixed by screws on a front cabinet.

Therefore, even when there is possibility that the gap A may remain between the rib 11a1 and the picture screen 21, the front wall 11 is bent toward backside together with the thin-wall portion 11e as shown in FIG. 6, and the rib 11a1 is closely fitted to the picture screen 21.

Figure 9:
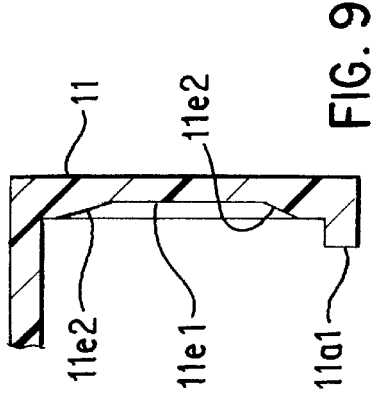
FIG. 9 is a cross-sectional view along the line B—B in FIG. 7.

As shown in FIG. 7 to FIG. 9, the thin-wall portion 11e has tilted portions 11e2 so that the thickness is gradually reduced toward the thinnest-wall portion 11e1 of approximately rectangular shape. The thickness is gradually reduced because this makes it possible to suppress and reduce angular part between the thin-wall portion 11e and the other portions of the front wall 11 and to keep the durability of the front wall 11.

Figure 10:
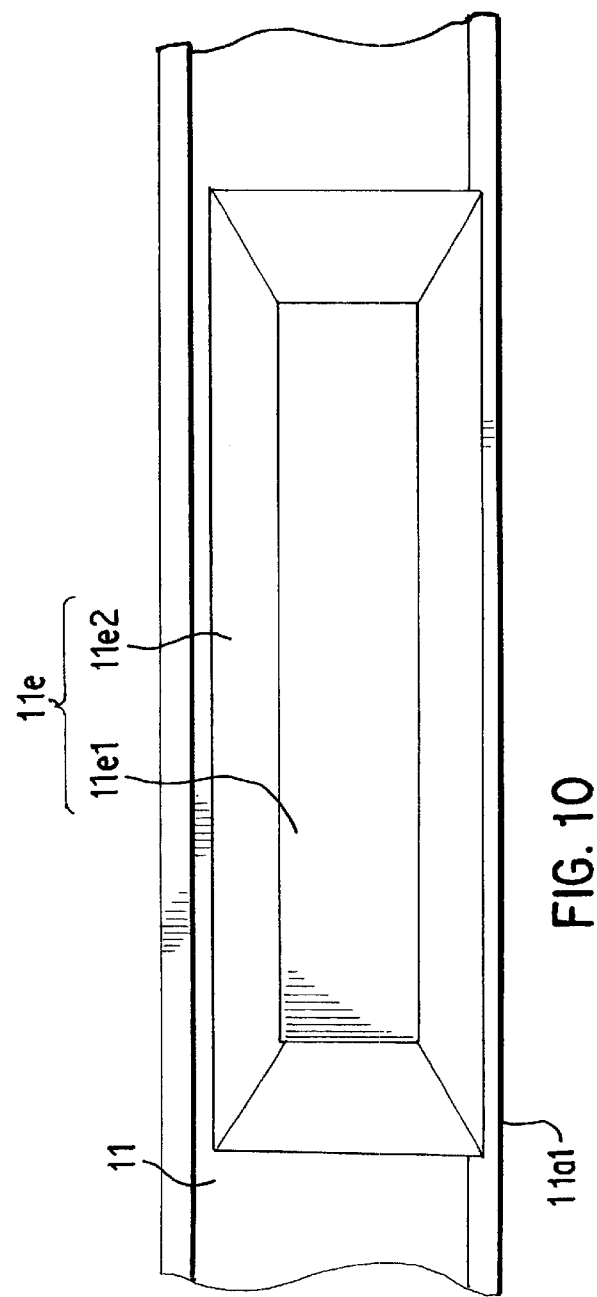
FIG. 10 is a plan view of an arrangement of a thin-wall portion in a variation of the present invention.

As shown in FIG. 10, it is also possible to design that the thin-wall portion 11e can include a part of the rib 11a1. The rib 11a1 is deformed in association with the bending of the front wall 11 and the rib 11a1 is more easily bent toward the picture screen 21 because of the thin-wall portion 11e. Thus, the rib 11a1 can be more easily and closely fitted to the picture screen 21.

As described above, the thin-wall portion 11e having thickness thinner than the other portions is provided between each of the linear portions of the rib 11a1 on peripheral edge of the opening 11a and each of the walls 12 to 14 surrounding the front wall 11. As a result, when the worker fastens the screws, the front wall 11 is bent toward the flat picture screen 21 in association with the movement of the screw-retaining boss 11b toward the screw mounting unit 22, and it is possible to closely fit the rib 11a1 to the picture screen 21.

I claim:

1. A television set, comprising:
   a picture tube having a flat picture screen on a front side;
   a front cabinet made of synthetic resin, which comprises
      a front wall with an opening having an approximately rectangular shape for allowing the picture screen to be kept at a position facing outward the front wall having a thickness and a backside surface, side walls, an upper wall and a lower wall extending rearwardly from the front wall so as to enclose peripheral edges of the front wall, a screw-retaining bosses used for fixing the picture tube, one boss being formed at each of four corners on the backside surface of the front wall, ribs closely fitted to the picture screen projecting rearwardly from the opening of the front wall, thin-wall portions of the front wall formed in the backside surface of the front wall between linear portions of said ribs and a peripheral edge of the front wall, the thin-wall portion having thinnest-wall portions that are approximately rectangular in shape and slanted portions in which the thickness of the front wall is gradually reduced to said thinnest-wall portions; and a rear cabinet, made of synthetic resin and having an approximately box-shaped, the rear cabinet being assembled by bringing an opening thereof face-to-face with an opening formed by the side walls, the upper wall and the lower wall of said front cabinet, wherein the thin-wall portions are designed such that when screws are fastened to the screw-retaining bosses, the front wall is bent toward the picture screen in association with movement of the screw-retaining bosses toward the picture screen to closely fit the ribs to the picture screen.

2. A front cabinet made of synthetic resin, comprising:

a front wall with an opening having an approximately rectangular shape for allowing the picture screen to be kept at a position facing outward, the front cabinet having a thickness and a backside surface; and side walls, an upper wall, and a lower wall extending rearwardly from the front wall so as to enclose peripheral edges of the front wall, wherein screw-retaining bosses used for fixing the picture screen, one boss being formed at each of four corners on the backside surface of the front wall, ribs closely fitted to the picture screen projecting rearwardly from the front wall, and wherein said front cabinet comprises thin-wall portions, each of said thin-wall portions having a thinnest-wall portion that is approximately rectangular in shape and slanted portions, each of said thinnest-wall portions being provided in the front wall between each of linear portions of said ribs and each wall surface enclosing peripheral edge of the front wall, the thin-wall portions are designed such that, when screws are fastened to the screw retaining bosses, the front wall is bent toward the picture screen in association with movement of the screw-retaining bosses toward the picture screen to closely fit the ribs to the picture screen, and each of said slanted portions gradually reduces the thickness of the front wall toward the thinnest-wall portion.

* * * * *